H. A. JONES & B. C. HARRELL.
BOLL WEEVIL MACHINE.
APPLICATION FILED NOV. 27, 1916.
1,243,302.
Patented Oct. 16, 1917.
2 SHEETS—SHEET 1.
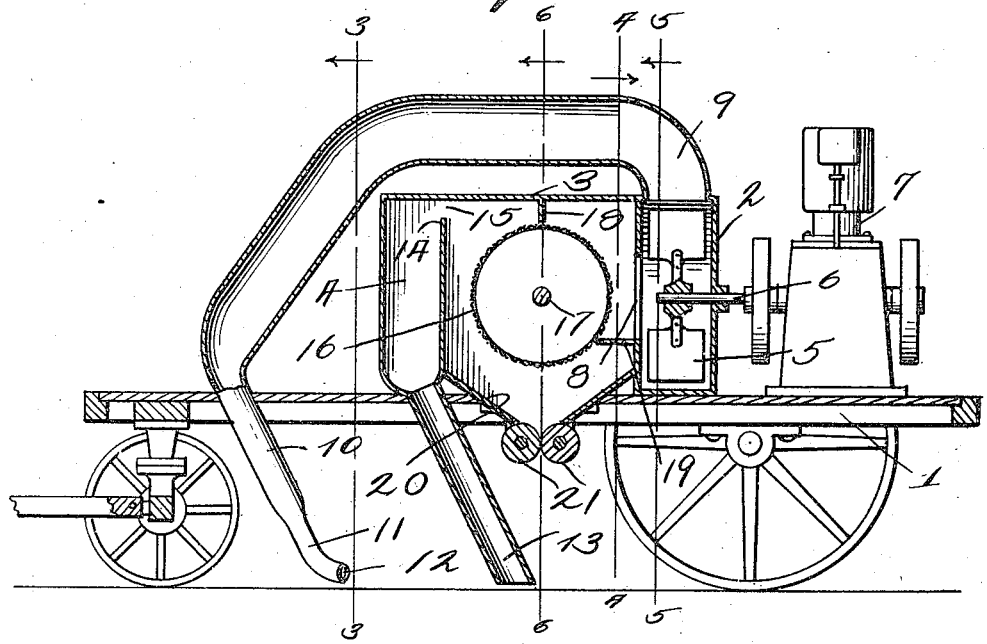
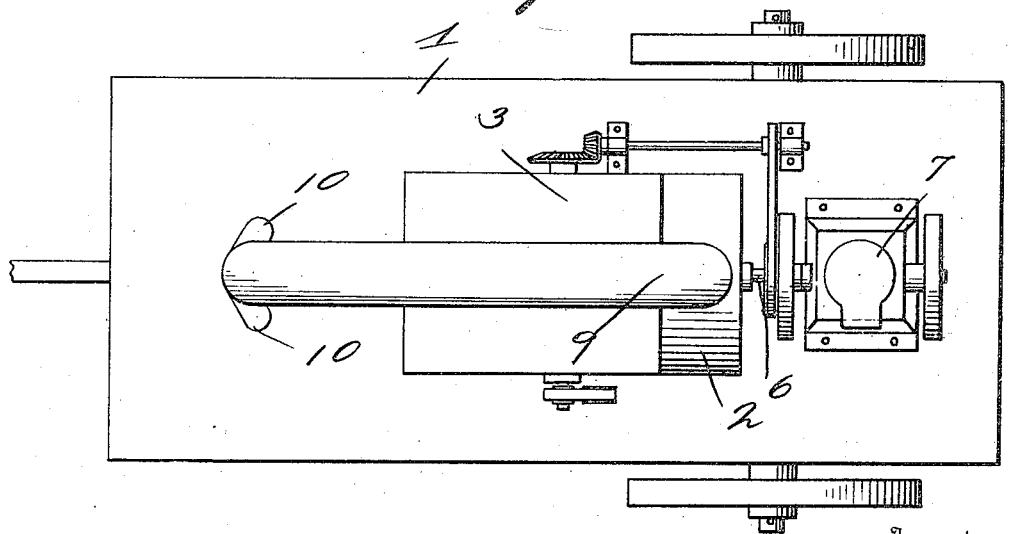

H. A. JONES & B. C. HARRELL.
BOLL WEEVIL MACHINE.
APPLICATION FILED NOV. 27, 1916.

1,243,302.

Patented Oct. 16, 1917.
2 SHEETS—SHEET 2.

Inventor
B. C. Harrell
H. A. Jones

UNITED STATES PATENT OFFICE.

HENRY A. JONES AND BILLINGTON C. HARRELL, OF YANCEY, TEXAS.

BOLL-WEEVIL MACHINE.

1,243,302.  Specification of Letters Patent. Patented Oct. 16, 1917.

Application filed November 27, 1916. Serial No. 133,772.

*To all whom it may concern:*

Be it known that we, HENRY A. JONES and BILLINGTON C. HARRELL, citizens of the United States, residing at Yancey, in the county of Medina, State of Texas, have invented certain new and useful Improvements in Boll-Weevil Machines; and we do hereby declare the following to be a full, clear, and exact description of the invention, such as will enable others skilled in the art to which it appertains to make and use the same.

This invention relates to insect destroyers and particularly to machines for destroying boll weevils.

The primary object of the invention is to provide a pneumatically operated machine for gathering up the boll weevils, the small infected bolls and squares which are subsequently crushed in order to completely destroy them.

A further object of the invention is to provide a boll weevil machine in which a longitudinal and transverse action wholly clears the ground between the cotton rows of all insects and fallen infected or punctured buds or bolls.

Another object of the invention consists in the provision of a particular machine for freeing the air of the gathered pests, and passing it into an exhaust chamber which communicates with the fan chamber so that the air currents constitute a practically continuous circuit.

It is furthermore an object of the invention to provide a peculiar form of separating mechanism for use in connection with the machine.

With the above objects in view and such others as will hereinafter appear, our invention will now be fully set forth and described, reference being had to the accompanying drawings.

In the drawings:—

Figure 1 is a longitudinal section taken through the machine,

Fig. 2 is a plan view thereof,

Figure 3:
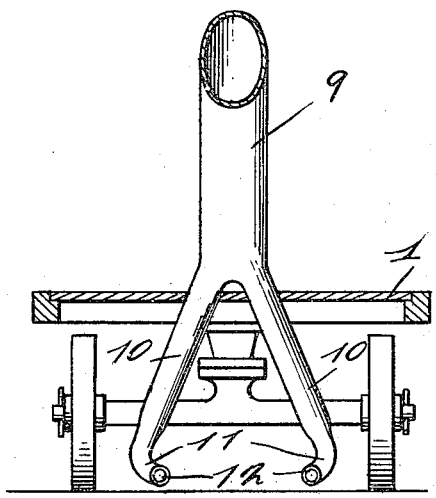
Fig. 3 is a section on line 3—3 of Fig. 1.
Figure 6:
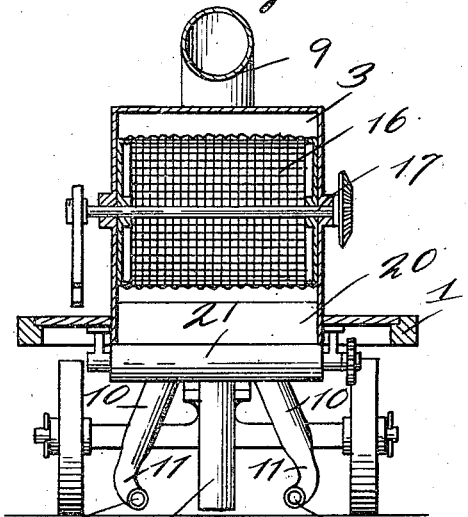
Fig. 6 is a section on line 6—6 of Fig. 1.
Figure 4:
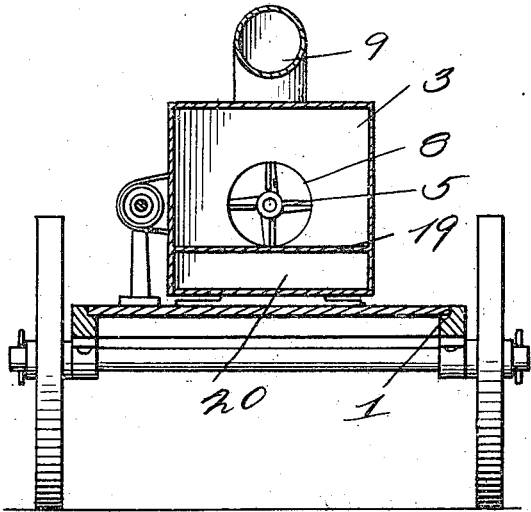
Fig. 4 is a section on line 4—4 of Fig. 1.
Figure 5:
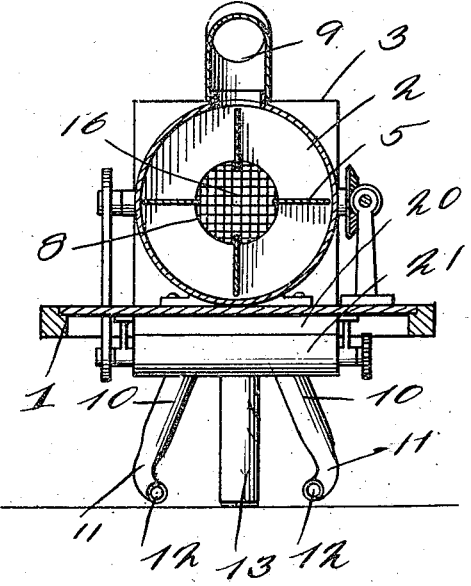
Fig. 5 is a section on line 5—5 of Fig. 1.

Referring more particularly to the drawings, 1 indicates the vehicle frame which is mounted upon suitable running gear and is preferably adapted to be drawn by a team of horses. Mounted upon the vehicle body 1 is a structure which includes a frame casing 2, a separator casing 3 and a suction chamber 4. This structure is formed of any suitable material, preferably sheet metal, and is mounted upon the vehicle body 1 in any suitable manner. The fan casing 2 extends across the vehicle and contains the fan 5 of the proper type which is mounted upon a shaft 6 directly driven from a power source as an internal combustion engine 7. An opening 8 in the front wall of the casing 2 permits the fan 5 to draw the air out of the separator chamber 3 and to deliver it through the top of the casing 2 by way of a conduit 9. The conduit 9 bends freely over the separator chamber 3 and then downwardly to the bed of the vehicle 1 at the forward end of the latter and there connects to a blower pipe 10 which is divided into a pair of blast nozzles 11. The blower pipe 10 and the blast nozzles 11 incline rearwardly, and the ends 12 of the nozzles 11 are turned horizontally and inwardly to direct convergent streams of air across the ground traversed by the machine, the blasts meeting substantially at the center of the suction nozzle 13. The latter extends downwardly and rearwardly into suitable proximity to the ground from the bottom of the suction chamber 4, and traverses a path which is substantially the median line between two rows when the vehicle is driven therebetween. The suction nozzle 13 delivers the material gathered thereby into the suction chamber 4, and from the chamber 4 the material is thrown over the rear wall 14 thereof through the passage 15 into the condenser chamber 3. From the opening 15, the blast is directed against the upper half of a rotary cylinder 16 which is mounted transversely of the machine upon a shaft 17 driven by the engine 7. A subsidiary chamber which incloses the opening 8 is subdivided from the separator chamber 3 by means of a vertical baffle wall 18 and a horizontal wall 19 which extend from the top and side of the chamber 3 respectively and have their free edges lying in close proximity to the periphery of the drum 16. The periphery of the drum 16 is perforated so that the air which is drawn into the chamber 3 from the suction 5 may pass therethrough into the subsidiary chamber and thence through the opening 8 into the fan chamber 2. However, all of the insects and material which is gathered by the nozzles 4 and carried through the suction chamber 5 into the chamber 3 is stopped by the cylinder 3, and as the latter rotates, the deposits of insects and material are dropped into the hopper shaped bottom 20 of the chamber 3 where they are gathered by the rollers 21 and crushed. The rollers 21 are properly driven from the engine 7 and as they are rotated and crush the deposits, the latter are finally dropped upon the ground in a destroyed condition. Those deposits which have a tendency to adhere to the periphery of the drum 16 are scraped off by the baffle wall 19.

The air blast after passing through the cylinder 16 pass through the subsidiary chamber and the opening 8, through the fan chamber 2 under the influence of the fan 5 and are thence driven again through the conduit 9 to carry out another cycle of functions.

The operation of the above described mechanism has been clearly pointed out in the course of the description, but it should be particularly noted that the combination of convergent air blasts and the suction nozzles at the meeting point of the air blasts tends to thoroughly clean the ground between the rows, the blasts agitating the insects and material upon the ground and blowing them rearwardly and inwardly toward the median line between the rows which constitutes the path of movement of the suction nozzles so that the products of the above mentioned agitation are completely gathered up.

Furthermore, it will be evident that we have devised a mechanism which is particularly advantageous for separating the insects, squares and other material picked up by the section nozzles from the blasts, so as to free the air blasts for a return through the pneumatic system to pass through another cycle of operation, the action of the blasts being thus strengthened and maintained.

What we claim as our invention is:—

1. In an insect destroying machine, the combination with a suction nozzle, blast nozzles mounted to direct their blasts to the mouth of the suction nozzle, a blast fan for drawing air from the suction nozzle and delivering it to the blast nozzles, and a separator interposed between the blast fan and the suction nozzle, said separator consisting of a receiving chamber, a subsidiary chamber, a rotatable perforated cylinder separating said chambers, and means in the bottom of the receiving chamber for crushing the deposits separated from the air blasts by the cylinder.

2. In an insect destroying machine, a separator comprising a receiving chamber, a rotatable perforated cylinder mounted in the receiving chamber, vertical and horizontal walls projecting from the top and side of the receiving chamber and terminating at the periphery of said rotatable cylinder and providing with the latter a subsidiary chamber, and means in the bottom of the receiving chamber for disposing of the deposits separated from the cylinder by air blasts which pass through the latter into the subsidiary chamber.

In testimony whereof, we affix our signatures in the presence of two witnesses.

HENRY A. JONES.
BILLINGTON C. HARRELL.

Witnesses:
  J. R. CHANCEY,
  R. J. ZERO.

Copies of this patent may be obtained for five cents each, by addressing the "Commissioner of Patents. Washington, D. C."